(12) United States Patent
Hewett et al.

(10) Patent No.: US 7,111,048 B2
(45) Date of Patent: *Sep. 19, 2006

(54) USING DYNAMIC WEB COMPONENTS TO AUTOMATICALLY CUSTOMIZE WEB PAGES

(75) Inventors: Delane Robert Hewett, Bellevue, WA (US); Johan A. F. Sundstrom, Kirkland, WA (US); Christopher J. Beiter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/271,216

(22) Filed: Nov. 10, 2005

(65) Prior Publication Data

US 2006/0064471 A1    Mar. 23, 2006

Related U.S. Application Data

(63) Continuation of application No. 09/773,725, filed on Jan. 31, 2001, now Pat. No. 6,973,483.

(60) Provisional application No. 60/237,067, filed on Sep. 30, 2000.

(51) Int. Cl.
*G06F 15/167* (2006.01)
*G06F 9/44* (2006.01)

(52) U.S. Cl. .................. 709/213; 709/203; 709/206; 709/228; 717/115

(58) Field of Classification Search ............ 709/213, 709/203, 206, 225; 717/115
See application file for complete search history.

(56) References Cited

U.S. PATENT DOCUMENTS

| | | | | |
|---|---|---|---|---|
| 6,014,638 A | * | 1/2000 | Burge et al. ............. | 705/27 |
| 6,163,779 A | * | 12/2000 | Mantha et al. ............ | 707/100 |
| 6,209,007 B1 | * | 3/2001 | Kelley et al. ............ | 715/513 |
| 6,247,032 B1 | * | 6/2001 | Bernardo et al. .......... | 715/530 |
| 6,305,188 B1 | * | 10/2001 | Park ......................... | 62/513 |
| 6,684,369 B1 | * | 1/2004 | Bernardo et al. .......... | 715/513 |
| 6,973,483 B1 | * | 12/2005 | Hewett et al. ............ | 709/213 |

* cited by examiner

*Primary Examiner*—Anthony Knight
*Assistant Examiner*—Thomas Pham
(74) *Attorney, Agent, or Firm*—Lyon & Harr, LLP; Mark A. Watson

(57) ABSTRACT

Internet web pages displayed via an Internet web browser or other applications are automatically customized. Dynamic "Web Components" are used to automatically customize web pages. Further, these Web Components use the same script and HTML for all implementations or instantiations of the Web Component regardless of which, or how many, unique local clients make use of the Web Component. This code reuse is accomplished by using entry web pages, or "entry points," as described in further detail below, to set the value of function properties or parameters of the Web Component for dynamically and automatically generating a web page. The script and/or HTML source code of the Web Component pages does not change based on each new implementation or instantiation. Consequently, little setup work is required for each implementation, and only a basic verification test pass is needed for each unique automatically customized Internet web page.

20 Claims, 3 Drawing Sheets

USING DYNAMIC WEB COMPONENTS TO AUTOMATICALLY CUSTOMIZE WEB PAGES

CROSS REFERENCE TO RELATED APPLICATIONS

This application is a Continuation Application of U.S. patent application Ser. No. 09/773,725, filed on Jan. 31, 2001 now U.S. Pat. No. 6,973,483 by Hewett, et al., and entitled "A SYSTEM AND METHOD FOR USING DYNAMIC WEB COMPONENTS TO AUTOMATICALLY CUSTOMIZE WEB PAGES". Note that the parent application Ser. No. 09/773,725, also claims the benefit of a previously filed U.S. provisional patent application, Ser. No. 60/237,067 filed on Sep. 30, 2000. As such, the present application also claims the benefit of U.S. provisional patent application, Ser. No. 60/237,067 filed on Sep. 30, 2000.

BACKGROUND

1. Technical Field

The invention is related to a system and process for automatically customizing an Internet web page displayed via an Internet browser or other application for displaying Internet web pages.

2. Related Art

By way of background, using existing schemes, third parties desiring to use features of other Internet web sites must either accept the feature-set and presentation of the existing web pages, or copy these pages to another web location, and alter the script and/or HTML defining the existing web pages to provide the customization desired. Consequently, more than one source-code base must be maintained for the same or similar web pages, with setup and server configuration changes necessary each time a new web page feature, such as, for example a calculator applet or credit card processing form, is implemented. Further, full test passes of the resultant HTML, and script that was modified, are typically performed to ensure error free web page operation.

Therefore, what is needed is a system and method for automatically customizing web pages without the need to manually copy and alter the script and/or HTML defining such web pages. In other words, this system and method should allow the reuse of a single code base to automatically provide a plurality of uniquely customized web pages. Further, this system and method should operate without the need to perform full testing of each instantiation of an automatically customized web page.

SUMMARY

The present invention involves a new system and process for automatically customizing an Internet web page displayed via an Internet browser or other application for displaying Internet web pages. The present invention uses "Web Components" to solve the aforementioned problems, as well as other problems that will become apparent from an understanding of the following description. Specifically, a Web Component according to the present invention uses the same script and HTML for all implementations of the Web Component, regardless of which, or how many, unique local clients make use of the Web Component to automatically generate uniquely customized web pages. This code reuse is accomplished by using entry web pages, or "entry points," as described in further detail below, to set the value of function properties or parameters of the Web Component for dynamically and automatically generating a web page. The script and/or HTML of the Web Component pages does not change based on each new implementation or instantiation. Consequently, little setup work is required for each implementation, and only a basic verification test pass is completed for the implementation rather than a full test pass as necessitated by previous schemes.

In general, at least one dynamically customizable Web Component is provided on a remote server to define what information (i.e. the information content) will be in a web page displayed by the Internet browser on a local client or transmitted to the Internet browser by the local client. In this context, a "local client" refers to a local client, a web server, a web site, a web page, an end-user computer, a specific server hosting web pages, any server or web page request originating from specific domains or IP addresses, any other computer system or application capable of accessing the remote server, or any combination of the aforementioned computers, servers, applications or processes. Examples of types of information that may be displayed include, for example, text, images (motion or still), audio data, applets, scripts, forms, hyperlinks, or any other data, information, or content that can be provided via the Internet from a remote server to a local client.

Further, in one embodiment, the Web Component defines how the displayed information will appear to a user, i.e. the color, style, layout, border, background, font size, type, style and characteristics, or any other desired parameters for defining the appearance of the information displayed by the Internet browser on the local client.

In another embodiment, alternate images for each individual instantiation of the Web Component are preferably stored in at least one computer readable storage medium including a database, script, or other electronic file addressable by the Web Component, using a file path stored as a parameter of the instance of the Web Component for dynamically and automatically generating the web page. Similarly, in another embodiment, text files that contain Web Component-specific textual data are preferably copied and/or altered, again using one or more file paths stored as a parameters of the instance of the Web Component for dynamically and automatically generating the web page. Use of alternate images and/or or text files, as described for the preceding embodiments, provides for simple customization of the Web Component by providing the ability to pre-define items such as images and/or text for use in specific instantiations of the Web Component.

Finally, in another embodiment, the system and process of the present invention employs each of the aforementioned embodiments, or any combination thereof in automatically defining the information displayed in at least one web page as well as the appearance of that information, and thus the appearance of the web page itself.

In general, the Web Component represents at least one dynamically configurable web page, and is comprised of at least one encapsulated web-based feature or function for defining one or more of information content, and information appearance, as described above. Consequently, one or more unique Web Components can be combined to form a complete web site, or portions thereof. The Web Component is customizable in that it is automatically and dynamically configured by setting one or more function properties associated with each function in response to a communication to the remote server from a local client. Further, the local client can itself be a web server or other server that is hosting a web site accessible to one or more end users.

Specifically, the Web Component is capable of automatically and dynamically generating at least one web page that is customized for display or hosting on the local client in response to specific function properties provided to the Web Component. Consequently, the Web Component is capable of being configured in any of a plurality of ways by simply setting one or more of the function properties in accordance with the communication from the local client to the remote server. As a result, separate local clients addressing the same Web Component can display or host either the same, more, less, or different information, having either the same or a different appearance, by simply passing different function properties to the same Web Component or by calling an intermediate page that sets these function properties. As for using an intermediate page, the local client may request a web page (i.e. an intermediate web page or "entry web page") that in turn, sets properties that are passed to the Web Component for dynamically generating a web page that is ultimately returned to the local client. In other words, a single Web Component automatically and dynamically generates one or more uniquely customized web pages for display or hosting on one or more local clients by processing function properties passed to the Web Component via a network or Internet by the local clients. Simply stated, the Web Component behaves differently depending upon how the function properties are set.

For example, by passing a first set of parameters to the Web Component, a first local client displays or hosts at least one different web page than a second local client that passes a second set of parameters to the same Web Component. Clearly, any number of local clients can send any combination of supported parameters to the Web Component to display or host visually or functionally different web pages automatically and dynamically configured in response to the parameters provided by each local client. Consequently, the same Web Component automatically and dynamically generates unique web pages in response to unique communications from separate local clients. Clearly, any number of functions and function properties may be associated with a Web Component to automatically and dynamically generate any number of unique web pages in response to any number of unique communications. Further, in one embodiment, intermediate pages store the desired values that the Web Component should use, and the intermediate page, in turn, passes the parameters to the Web Component. This intermediate page stores desired parameters or values, then calls the Web Component, passing these values in order to have the Web Component dynamically generate a web page having desired characteristics.

Each implementation of a particular Web Component may be represented by one or more HTML or scriptable (i.e., ASP, CGI, PERL, etc.) pages on a virtual root of an Internet web server. As stated above, a Web Component may represent a single web page or a series of web pages representing, primarily, a single user process such as performing a calculation or applying for a loan, or a multi-user process such as a multi-player game. The actual script and HTML content for a Web Component are shared across all implementations or instantiations of the Web Component, thereby allowing substantial code reuse, with corresponding lower test costs and faster time-to-market for a new user of the component. Web components are preferably designed to run in an HTML frame but alternately, may run in a separate window.

Particular implementations or instantiations of an individual Web Component may include, for example, images that appear in the page(s) of the Web Component (via an image path defined for the Web Component, as described above); colors for each of the particular styles of text (including color changes associated with events performed on the page); textual content that appears in specific sections of the component (managed with included files with same names but different file paths); parameters that affect the functionality of the component (i.e. URLs associated with a form post, hiding or showing content specific to a Web Component implementation (i.e. whether to collect a credit card number as part of a user process); and hiding or showing links to other Web Components based on whether a particular user web site is allowed access to those components.

In one embodiment, the Web Component has a plurality of different URL's, or addresses, as entry web pages or "entry points" to the Web Component. Consequently, a specific entry point acts as the Web Component users "public interface" to the component and can, for example, accept parameters appended to the URL and modify content or functionality based on what is passed; validate that the referring URL is authorized to host the Web Component; redirect to an error page if the referring URL is not authorized to host the Web Component; set or override default values for function properties used in the Web Component; hide the internal page structure of the site such as by providing a "published" consistent interface similar to typical software components such as COM-based objects; and/or allow logging of data associated with use of the component by a particular implementation.

Use of user-specific entry points allows for predefined customization of the dynamically and automatically generated web pages by using customization information stored in a Web Component accessible computer readable storage medium including a database, script, or other electronic file, containing function parameter data specific to local clients. Further, while specific entry points are different for each local client, local clients may access a Web Component through one or more entry points. Consequently, local clients may cause the Web Component to generate different web pages, or similar web pages having either more or less features by simply entering the same Web Component through unique entry points specific to that local client. Again, entry points are simply URL's or addresses used to call the Web Component.

In a simple working example of the Web Component, during the design of a Web Component, a determination of what parameters or function properties of the Web Component will be alterable by a particular implementation is made. Each HTML text type is covered by a CSS Style and therefore can be customized for each implementation or instantiation of the Web Component. After these function properties have been determined, script and/or include files are created to augment the look or behavior of the Web Component for each function parameter, based on the range of possible values for each function properties. Further examples of function properties include a string value such as, for example, "CompanyName" that is set to the company name of a company using the Web Component, or a binary decision such as whether to show a link. Other function properties include flags as to whether to display one of more types of information or fragments of content based on the desired implementation.

Once the Web Component has been developed, it is implemented by first creating an entry-point ASP, HTML page or database calls passing the identity of the component implementation. The entry point page generally resides on a different web virtual directory within the remote server than the HTML and ASP pages representing the Web Component itself. This entry point page may collect parameters passed by the host of the Web Component and uses these parameters to set function property values in the Web Component. Alternately, as described above, the entry-point page itself will set the values of the individual function properties before redirecting to the actual HTML or scriptable (i.e., ASP, CGI, PERL, etc.) pages comprising the Web Component. These function properties may be stored on the redirect page as script variables, or read from a server-based object used to fetch values from a name/value pair storage based on the function parameter name provided. The entry point pages will also set the virtual path to any image folders and include folders used to store images and include files specific to each Web Component implementation, i.e., specific to each local client or "individual user," as described above.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
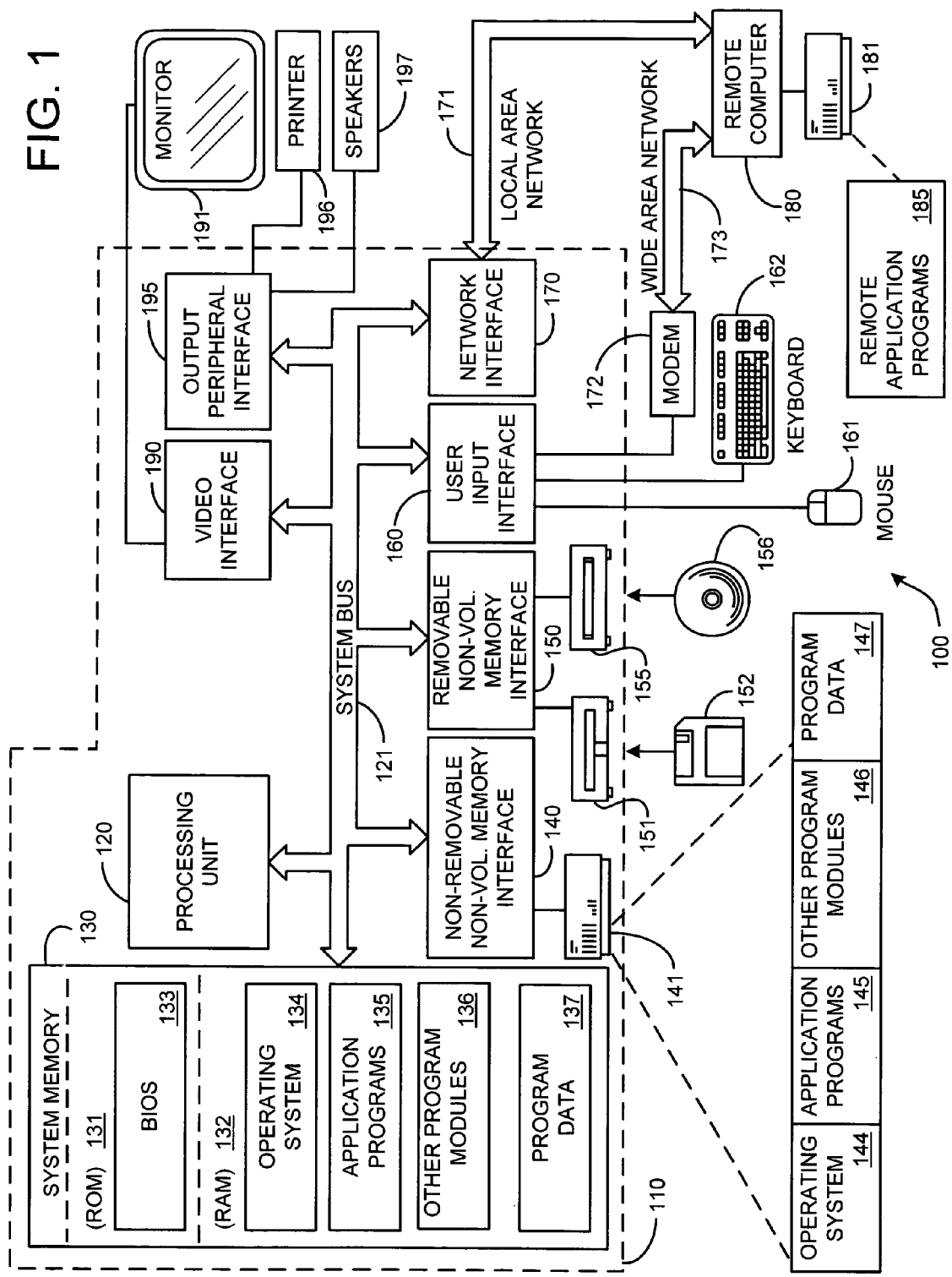
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

System Overview:

The present invention involves a new system and process for using "Web Components" for automatically customizing Internet web pages displayed via an Internet browser or other application for displaying Internet web pages. A Web Component according to the present invention uses the same script and HTML for all implementations of the Web Component regardless of which, or how many, unique local clients make use of that Web Component to automatically generate uniquely customized web pages. This code reuse is accomplished by using entry web pages, or "entry points," as described in further detail below, to set the value of function properties or parameters of the Web Component for dynamically and automatically generating a web page. The script and/or HTML of the Web Component pages does not change based on each new implementation or instantiation and so there is little setup work and only a basic verification test pass is completed for the implementation rather than a full test past as necessitated by previous schemes.

Figure 2:
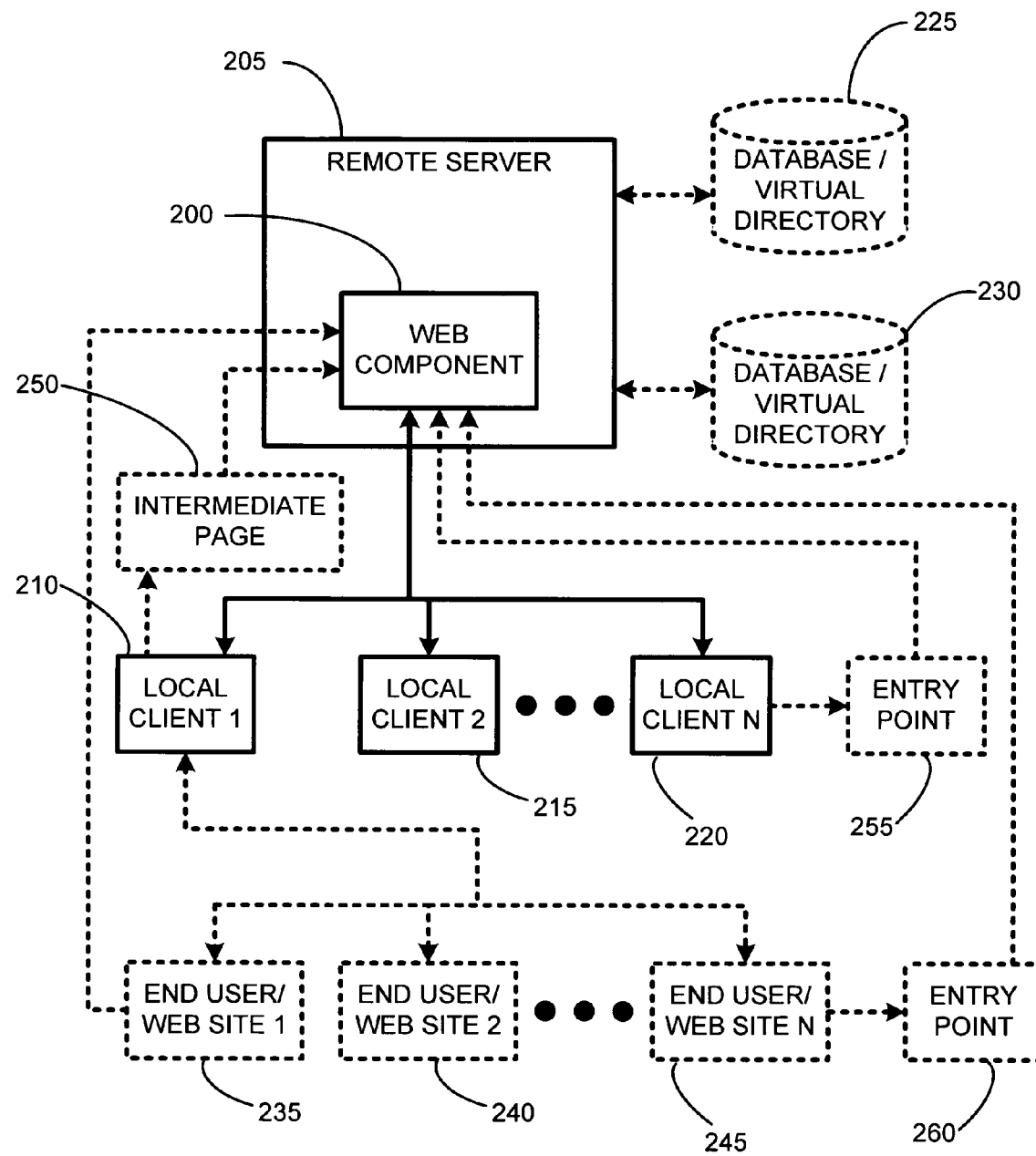
FIG. 2 illustrates an exemplary architectural flow diagram for implementing the present invention

FIG. 2 illustrates one exemplary architectural/flow diagram for implementing the present invention as described above, with the dashed lines representing the aforementioned alternate embodiments and/or optional components or connections.

In general, with reference to FIG. 2, at least one dynamically customizable Web Component 200 is provided on a remote server 205 to define what information (i.e. the information content) will be displayed in a web page by the Internet browser or similar application on any number of local clients 210, 215 or 220. In this context, the "local client" 210, 215 or 220, refers to a local client computer, a web server, a web site, a web page, an end-user computer, a specific server hosting web pages, any server or web page request originating from specific domains or IP addresses, any other computer system or application capable of accessing the remote server 205, or any combination of the aforementioned computers, servers, applications or processes. Examples of types of information that may be displayed include, for example, text, images (motion or still), audio data, applets, scripts, forms, hyperlinks, or any other data, information, or content that can be provided via the Internet from the remote server 205 to a local client 210, 215 or 220.

Further, in one embodiment, the Web Component 200 defines how the displayed information will appear to a user, i.e. the color, style, layout, border, background, font size, type, style and characteristics, or any other desired parameters for defining the appearance of the information displayed by the Internet browser on the local client.

In another embodiment, alternate images for each individual instantiation of the Web Component 200 are preferably stored in at least one computer readable storage medium including a database, script, or other electronic file 225 or 230 addressable by the Web Component 200, using a file path stored as a parameter of the instance of the Web Component for dynamically and automatically generating the web page. Similarly, in another embodiment, text files that contain Web Component-specific textual data are preferably copied and/or altered, again using one or more file paths stored as parameters of the instance of the Web Component 200 for dynamically and automatically generating the web page. Use of alternate images and/or text files, as described for the preceding embodiments, provides for simple customization of the Web Component 200 by providing the ability to pre-define items such as images and/or text for use in specific instantiations of the Web Component.

Finally, in another embodiment, the system and process of the present invention employs each of the aforementioned embodiments, or any combination thereof in automatically defining the information displayed in at least one web page as well as the appearance of that information, and thus the appearance of the web page itself.

Operation:

In general, the Web Component 200 represents at least one dynamically configurable web page, and is comprised of at least one encapsulated web-based feature or function for defining one or more of information content and information appearance, as described above. Consequently, one or more unique Web Components 200 can be combined to form a complete web site, or portions thereof. The Web Component 200 is customizable in that it is automatically and dynamically configured by setting one or more function properties associated with each function in response to a communication to the remote server 205 from a local client 210, 215 or 220. Further, the local client 210, 215 or 220 can itself be a web server or other server that is hosting a web site accessible to one or more end users 235, 240, or 245.

Specifically, the Web Component 200 is capable of automatically and dynamically generating at least one web page that is customized for display or hosting on the local client 210, 215, or 220 in response to specific function properties provided to the Web Component. Consequently, the Web Component 200 is capable of being configured in any of a plurality of ways by simply setting one or more of the function properties in accordance with the communication from the local client to the remote server. As a result, separate local clients 210, 215 or 220 addressing the same Web Component 200 can display or host either the same, more, less, or different information, having either the same or a different appearance, by simply passing different function properties to the same Web Component or by calling an intermediate page 250 that sets these function properties.

Further, different intermediate pages 250 can be called by the local clients 210, 215 or 220 in order to pass different function properties to the same Web Component 200. As for using the intermediate page 250 the local client 210, 215 or 220 may request any of a number of web pages (i.e. an intermediate web page 250) that in turn, set properties that are passed to the Web Component 200 for dynamically generating a web page that is ultimately returned to the local client, which may be further provided to a web site accessible to one or more end users 235, 240, or 245. In other words, a single Web Component 200 automatically and dynamically generates one or more uniquely customized web pages for display or hosting on one or more local clients 210, 215 or 220 by processing function properties passed to the Web Component via a network or Internet by any of the local clients. Simply stated, the Web Component 200 behaves differently depending upon how the function properties are set.

For example, by passing a first set of parameters to the Web Component 200, a first local client 210 displays or hosts at least one different web page than a second local client 215 that passes a second set of parameters to the Web Component. Clearly, any number of local clients 21, 215, or 220 can send any supported combination of parameters to the Web Component 200 to display or host visually or functionally different web pages automatically and dynamically configured in response to the parameters provided by each local client.

In particular, in one trivial example, the Web Component 200 includes functions for providing a financial calculator applet, a scientific calculator applet, a page background color of blue, red, green or yellow, and an image from a computer readable storage medium including a image database, script, or other electronic file 225 or 230, specific to the implementation of the Web Component, as described above.

Using the example above, the first local client 210 passes parameters to the Web Component 200, either directly, or via the intermediate page 250, requesting a web page displaying the financial calculator and a blue background. The Web Component 200 then automatically and dynamically generates a web page, having a financial calculator on a blue background, which is transmitted from the remote server 205 to the first local client 210. Similarly, the second local client 215 addressing the same Web Component 200 passes parameters to the Web Component requesting a web page displaying both a financial calculator and a scientific calculator, with a yellow page background. The Web Component 200 then automatically and dynamically generates a web page, having both a financial calculator and a scientific calculator on a yellow background, which is transmitted from the remote server 205 to the second local client 215. Similarly, a third local client 220 addressing the same Web Component 200 passes parameters to the Web Component requesting a web page displaying a scientific calculator, a green page background, and a known image from the image database, script, other electronic file 225 or 230. The Web Component 200 then automatically and dynamically generates a web page, having a scientific calculator on a green background along with the known image, which is transmitted from the remote server 205 to the third local client 220.

In accordance with this trivial example, three unique web pages have been automatically and dynamically generated by the same Web Component 200 in response to a unique communication from each of three separate local clients 210, 215, and 220. Clearly, any number of functions and function properties may be associated with a Web Component 200 to automatically and dynamically generate any number of unique web pages in response to any number of unique communications. It is also possible that any number of intermediate pages 250 may store the desired values that the Web Component should use, and the intermediate pages, in turn, pass the parameters to the Web Component 200. For example, one intermediate page 250 may be a conventional Active Server Page (ASP), called, for instance, "GreenFinancialCalculator.asp," that stores the parameters "Color=Green" and "Type=Financial" and then call the Web Component 200, passing these values in order to have the Web Component dynamically generate a web page having a financial calculator on a green background in accordance with the preceding example.

Each implementation of a particular Web Component 200 may be represented by one or more HTML or scriptable (i.e., ASP, CGI, PERL, etc.) pages on a virtual root of an Internet web server. As stated above, a Web Component 200 may represent a single web page of a series of web pages representing, primarily, a single user process such as performing a calculation or applying for a loan, or a multi-user process such as a multi-player game. The actual script and HTML content for a Web Component 200 are shared across all implantations or instantiations of the Web Component, thereby allowing substantial code reuse, with corresponding lower test costs and faster time-to-market for a new user of the component. Web components 200 are preferably designed to run in an HTML frame but alternately, may run in a separate window.

Particular implementations or instantiations of an individual Web Component 200 may include, for example, images that appear in the page(s) of the Web Component (via an image path defined for the Web Component, as described above); colors for each of the particular styles of text (including color changes associated with events performed on the page); textual content that appears in specific sections of the component (managed with included files with same names but different file paths); parameters that affect the functionality of the component (i.e. URLs associated with a form post, hiding or showing content specific to a Web Component implementation (i.e. whether to collect a credit card number as part of a user process); and hiding or showing links to other Web Components based on whether a particular user web site is allowed access to those components.

In one embodiment, the Web Component 200 has a plurality of different URL's, or addresses, as entry web pages or "entry points" 255 and 260 to the Web Component. Consequently, a specific entry point 255 or 260 acts as a users "public interface" to the Web Component 200 and can, for example, accept parameters appended to the URL and automatically modify content or functionality based on what is passed; validate that the referring URL is authorized to host the Web Component; redirect to an error page if the referring URL is not authorized to host the Web Component; set or override default values for function properties used in the Web Component; hide the internal page structure of the site such as by providing a "published" consistent interface similar to typical software components such as COM-based objects; and/or allow logging of data associated with use of the Web Component by a particular implementation.

Use of user-specific entry points 255 or 260 allows for predefined customization of the dynamically and automatically generated web pages by using customization information stored in a Web Component accessible database, script, or other electronic file 225 or 230 containing function parameter data specific to local clients 210, 215, or 220. Further, while specific entry points 255 or 260 are different for each local client 210, 215, or 220, local clients may access a Web Component 200 through one or more entry points. Consequently, a particular local client, i.e. local client 210, can cause the Web Component 200 to generate different web pages, or similar web pages having either more or less features by simply entering the same Web Component through unique entry points specific to that local client. Again, entry points are simply URL's or addresses, with or without parameters appended to the URL, used to call the Web Component 200.

Figure 3:
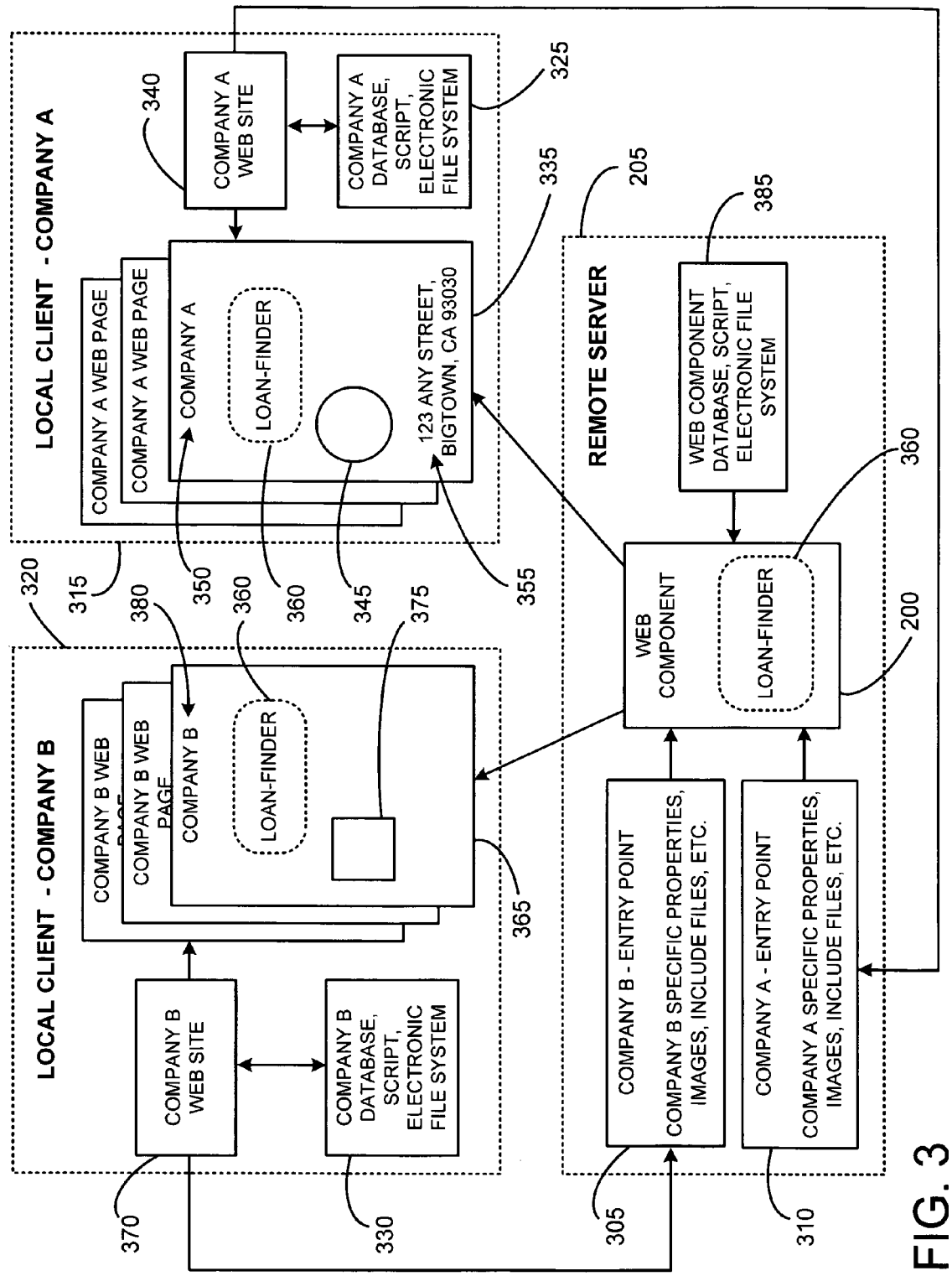
FIG. 3 is an exemplary flow diagram for implementing a working example of the present invention.

Working Example:

FIG. 3 illustrates a working example according to the present invention. In particular, in a simple working example of the Web Component 200, during the design of a Web Component, a determination of what parameters or function properties, images, include files, etc. of the Web Component will be alterable by a particular implementation (i.e. a particular user or calling web site) is made. In this example, each HTML text type is covered by a Cascading Style Sheet (i.e. a "CSS Style") and therefore can be customized for each implementation or instantiation of the Web Component 200. Cascading Style Sheets (CSS) is a conventional feature added to HTML that gives both Web site developers and users more control over how different elements of web pages are displayed.

After the function properties have been determined, script and/or include files are created to augment the look or behavior of the Web Component 200 for each function parameter, based on a range of possible values for each of the function properties. Further examples of function properties include a string value such as "CompanyName" that is set to the company name of a company using the Web Component 200 or a binary decision such as whether to show a link. Other function properties include flags as to whether to display one of more types of information or fragments of content based on the desired implementation.

Once the Web Component 200 has been developed, it is implemented by first creating an entry-point ASP, HTML page or database calls passing the identity of the component implementation. The entry point page 305 or 310 generally resides on a different web virtual directory within the remote server 205 than the HTML and ASP pages representing the Web Component 200 itself. This entry point page 305 or 310 may collect parameters passed by the host of the Web Component 200 and uses these parameters to set function property values in the Web Component. Alternately, as described above, the entry point page 305 or 310 itself will set the values of the individual function properties before redirecting to the actual HTML or scriptable (i.e., ASP, CGI, PERL, etc.) pages comprising the Web Component 200. These function properties may be stored on the redirect page as script variables, or read from a server-based object used to fetch values from a name/value pair storage based on the function parameter name provided. The entry point pages 305 or 310 will also set the virtual path to any image folders and include folders contained in a computer readable medium, and including an electronic database, script, or other electronic file 325 or 330, used to store images and include files specific to each Web Component implementation, i.e., specific to each local client 315 or 320 or "individual user," as described above.

Given this exemplary discussion of one method for implementing the Web Component 200, the following example describes how a simple one-page Web Component illustrated by FIG. 3 may be implemented:

First, a web page is created for the Web Component 200. This exemplary Web Component 200 has a default name/address such as, for example:

http://WebComponent.Com/Components/Component1/
      Default.asp

Further, this exemplary Web Component 200 contains one image "Logo.gif," one text string variable called "CompanyName," one include file called "Include.inc," a functional parameter on whether to show a company address called "ShowAddress," and generic code or script for providing loan information (i.e. a "Loan Finder" 360) to an end-user.

To implement the exemplary Web Component 200 for a particular company, i.e. "Company A", an entry point page 310 is created. This page is called, for example:

http://WebComponent.Com/CompanyA/Entrypoint.asp

This page uses a server-side script to set the values of:
ImagePath=http://WebComponent.Com/CompanyA/Images
CompanyName="Company A"
ShowAddress="True"
IncludePath=http://WebComponent.Com/CompanyA/Include Similarly, to implement the exemplary Web Component 200 for a second company, i.e. "Company B", a second entry point page 305 is created called, for example:

http://WebComponent.Com/CompanyB/Entrypoint.asp

This page also uses a server-side script to set the values of:
ImagePath=http://WebComponent.Com/CompanyB/Images
CompanyName="Company B"
ShowAddress="False"
IncludePath=http://WebComponent.Com/CompanyB/Include An include file for Company A (i.e., Include.inc) has Company A-specific text describing the company and the address of the company and is stored in the specified IncludePath. The image Logo.gif is specific to Company A, and is stored in the specified ImagePath folder. The Web Component automatically looks for the value of "ShowAddress" for Company A, and because it is set to "True," the Web Component will automatically generate a web page displaying the address information from the include file. Similarly, an include file for Company B has Company B-specific text describing the company and the address of the company and is stored in the specified IncludePath. In this case, the image Logo.gif is specific to Company B, and is stored in the specified ImagePath folder for Company B. Again the Web Component 200 automatically looks for the value of "ShowAddress," and because, for Company B, it is set to "False," the Web Component will not display the address information from the include file in the automatically generated web page for Company B.

Further, because the exemplary Web Component 200 also includes generic code or script for providing loan information to an end-user, the web component will provide this code in the automatically generated web page for each unique local client 315 or 320. Specifically, given the aforementioned parameters for Company A and Company B, the Web Component 200 will automatically generate a web page 335 for a Company A website 340 that includes the Company A image "Logo.gif" 345, the name "Company A" 350 and the address 355 for Company A in combination with the "Loan Finder" 360 functionality described above. Similarly, the Web Component 200 will automatically generate a web page 365 for a Company B web site 370 that includes the Company B image "Logo.gif" 375 and the name "Company B" 380 in combination with the aforementioned "Loan Finder" 360 functionality. While the appearance of these two automatically generated web pages 335 and 365 are different, i.e. different names and images, both share the "Loan Finder" 360 functionality.

Finally, the Web Component 200 may also draw on one or more databases, scripts, or other electronic files 385 to provide specific data, text, images, scripts, etc. For example, the images for either or both Company A or Company B, can be hosted on the remote server 205, and provided to the Web Component 200 when the Web Component automatically generates customized web pages as described above.

Clearly, the same Web Component 200 is used in this working example to automatically generate two unique web pages, automatically customized for separate local clients 315 and 320 by simply using two separate predefined entry points 305 or 310 to access the Web Component. Further, any amount of commonality may also be included in such automatically generated web pages, such as, for example, by providing one or more common scripts, applets, etc., such as the aforementioned "Loan Finder" 360 script. Further, simply updating common scripts such as "Loan Finder" 360 in the Web Component 200 serves to automatically update any calling web sites the next time that such web sites make use of the Web Component. Consequently, as described above, only one test pass of an updated script, such as "Loan Finder" 360, is needed to verify proper functionality on any of a plurality of web sites.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically generating at least one web page comprising using a computing device to perform steps for:
running at least one web page generation script on a remote server computer;
wherein each web page generation script includes at least one encapsulated web-based function for defining at least one characteristic of each automatically generated web page, and wherein each web-based function further includes at least one variable function parameter;
wherein each web page generation script includes a plurality of unique entry points addressable by each local client computer;
automatically generating the at least one unique web page by setting at least one of the variable function parameters of at least one of the web page generation scripts depending upon which entry point is addressed by a communication from at least one local client computer to the remote server; and
automatically transmitting each automatically generated web page from the remote server to the local client.

2. The method of claim 1 wherein setting at least one the variable function parameters serves to define the appearance of at least one of page color, page style, page layout, page border, page background, font size, font type, font style, font color, font characteristics, included images, and scripts, for each automatically generated web page.

3. The method of claim 1 wherein at least one image is automatically included in each automatically generated web page, and wherein each image is stored in at least one computer readable storage medium addressable by at least one of the web page generation scripts.

4. The method of claim 3 wherein alternate images are automatically chosen by providing alternate file paths for at least one function parameter.

5. The method of claim 1 wherein at least one text file is automatically included in each automatically generated web page, and wherein each text file is stored in at least one computer readable storage medium addressable by at least one of the web page generation scripts.

6. The method of claim 5 wherein alternate text files are automatically chosen by providing alternate file paths for at least one function parameter.

7. The method of claim 1 wherein at least one web page generation script further comprises at least one predefined script that is automatically included in at least one automatically generated web page.

8. The method of claim 7 wherein the at least one predefined script is automatically retrieved by at least one web page generation script from at least one computer readable storage medium.

9. The method of claim 1 wherein the communication from at least one local client computer to the remote server includes transmitting values from at least one intermediate web page to at least one of the web page generation scripts.

10. A system for automatically generating web pages comprising:
providing a remote server computer in communication with the Internet, the remote server hosting a dynamic web page generation script having two or more pre-defined entry points addressable by at least one local client computer;
receiving an input at the remote server from one of the local client computers via the Internet;
automatically passing the received input to one of the web page generation script entry points;
on the remote server, automatically generating at least one web page in response to the input passed to one of the web page generation script entry points; and
wherein the at least one web page automatically generated in response to the input passed to one of the web page generation script entry points is unique from web pages automatically generated in response an input passed to any other of the web page generation script entry points.

11. The system of claim 10 wherein the input received by the remote server computer from one of the local client computers is provided via a pre-defined intermediate page called by the local client computer.

12. The system of claim 10 wherein the web page generation script is represented by at least one of HTML, ASP, CGI, and PERL scripts.

13. The system of claim 10 wherein the web page generation script is reusable by a plurality of unique local client computers for automatically generating a plurality of uniquely customized web pages.

14. The system of claim 10 wherein the web page generation script further provides the remote server computer with the capability to automatically determine whether a local client computer is authorized to access the web page generation script.

15. The system of claim 10 wherein each web page is automatically transmitted via the Internet from the remote server computer to at least one of the local client computers.

16. A method for dynamically generating at least one web page, said web page generation script comprising:
a dynamic web page generation script capable of accepting parameters passed from an intermediate page used to call the dynamic web page generation script;
wherein the dynamic web page generation script further comprises at least one encapsulated web-based function which is automatically configured in response to the parameters passed from the intermediate page, and wherein the dynamic web page generation script also includes a plurality of addressable entry points;
dynamically generating at least one customized web page in response to the automatic configuration of each encapsulated web-based function, wherein the appearance and content of each dynamically generated customized web page is dependant upon which entry point is addressed by the intermediate page; and
transmitting each customized web page from a remote host computer to at least one local client computer via a network.

17. The method of claim 16 wherein the dynamic web page generation script automatically includes at least one applet in each customized web page.

18. The method of claim 17 wherein at least one of the applets is retrieved by the web page generation script from at least one computer readable storage medium.

19. The method of claim 16 wherein the web page generation script is represented by at least one of HTML, ASP, CGI, and PERL scripts.

20. The method of claim 16 wherein the web page generation script is reusable by a plurality of unique local client computers for automatically generating a plurality of uniquely customized web pages.

* * * * *